United States Patent Office 2,929,680
Patented Mar. 22, 1960

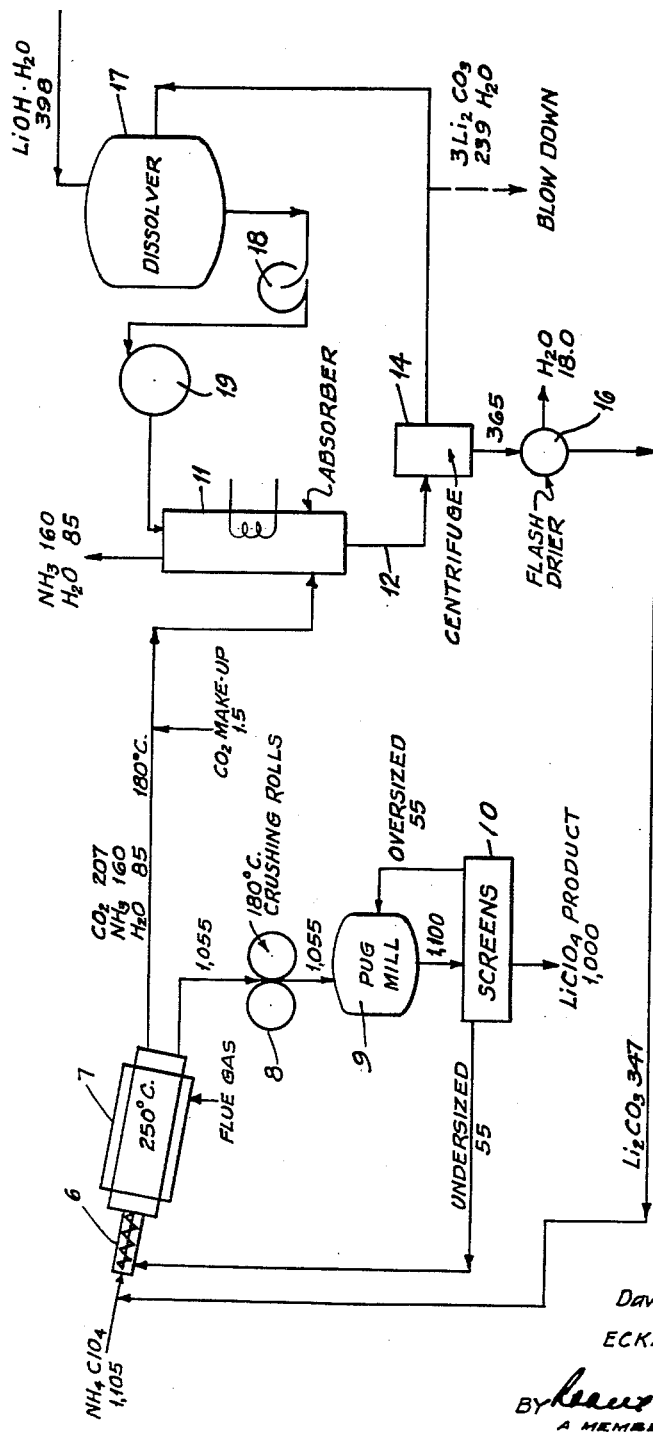

2,929,680
PREPARATION OF LITHIUM PERCHLORATE

David R. Stern, Fullerton, Calif., assignor to American Potash & Chemical Corporation, a corporation of Delaware Application June 28, 1957, Serial No. 668,769

5 Claims. (Cl. 23—85)

This invention relates to a process for the preparation of anhydrous lithium perchlorate.

Lithium perchlorate is in increasing demand as a solid oxidizer in rocket propellants. It has a high available oxygen content, is relatively stable, melting at 250° C., has a high density, and yields a rather high specific impulse since its flame temperature is high and the average molecular weight of its combustion products are low.

Mellor cites three methods of preparing lithium perchlorate. They may be represented chemically as follows:

$$LiOH + HClO_4 \cdot 2H_2O \xrightarrow{(70\text{-}72\% \text{ acid})} LiClO_4 + 3H_2O \quad (1)$$

$$Li_2CO_3 + 2(HClO_4 \cdot 2H_2O) \rightarrow 2LiClO_4 + 5H_2O + CO_2 \quad (2)$$

$$LiCl + HClO_4 \cdot 2H_2O \rightarrow LiClO_4 + HCl + 2H_2O \quad (3)$$

These methods have the disadvantage that they require expensive and difficult to handle perchloric acid. Moreover, since they are carried out in the presence of water, the stable trihydrate of lithium perchlorate is formed. The hydrated water must be removed by difficult drying techniques since the trihydrate is so soluble that it will melt in its own water of crystallization before dehydrating.

I propose to prepare lithium perchlorate in a molten state by the following reaction:

$$Li_2CO_3 + 2NH_4ClO_4 \rightarrow 2LiClO_4 + 2NH_3 + CO_2 + H_2O \quad (4)$$

If one compares this system with those of Equations 1, 2 and 3, it will be seen that one theoretically could evaporate per mole of lithium perchlorate six, five and four times as much water. If Reactions 1, 2 or 3 are carried out in an aqueous medium, the quantity of water may be ten to fifteen times as much, while the present process is carried on under anhydrous conditions. The process of Equation 4 has several advantages over earlier methods as follows:

(1) Uses readily available chemical raw materials in their industrial available form, i.e., $LiOH \cdot H_2O$ and $NH_4ClO_4$.

(2) Considerable less water evaporation required since reaction takes place in a completely anhydrous medium and lithium carbonate is practically insoluble.

(3) No vacuum or extreme drying times are required.

(4) Process readily conducted on a continuous basis.

(5) Any closed plant cycle requires an impurity blow down stream. The chemical efficiency of this process will be high since the blow down takes place with a stream which contains very little lithium. Any plant using an aqueous stream cycle containing $LiClO_4$ loses considerable lithium since lithium perchlorate is extremely soluble.

(6) Technical LiOH and $Li_2CO_3$ and $NH_4ClO_4$ contains organics which can give an off color product. Reacting these materials at elevated temperatures oxidizes the organics to carbon dioxide giving a white product.

A flow sheet and material balance for the process are given in Figure 1.

Solid $NH_4ClO_4$ and $Li_2CO_3$ are mixed in a screw feeder. This mixture drops into a heel of molten $LiClO_4$ maintained at 250°–275° C. in a reactor 7. Reaction takes place liberating $NH_3$, $CO_2$ and water vapor. The molten lithium perchlorate drops on hot crushing rolls 8 maintained at a temperature in excess of 180° C. The perchlorate is then reduced in size in a pug mill 9. The ground product is sized on screen 10, oversize being returned to the crusher, the undersize to the reactor and the product being recovered as desired.

The exhaust gas is passed through a lithium hydroxide scrubber 11, which selectively removes carbon dioxide as lithium carbonate, which is removed through line 12 to a centrifuge 14. Wet solids from the centrifuge are dried in flash drier 16 and returned as make-up lithium carbonate. The liquid stream from the centrifuge contains a small amount of carbonate and this stream is sent to the lithium hydroxide dissolver 17 or a portion can be removed to prevent impurities from accumulating. The lithium hydroxide stream is fed by pump 18 to the filter 19 and thence to the absorber 11.

Typical examples illustrating the practice of this invention are as follows:

| Example | Batch I | Continuous II |
|---|---|---|
| $Li_2CO_3$ (lbs.) | 348 | 348 |
| $NH_4ClO_4$ (lbs.) | 1105 | 1105 |
| Mol Ratio ($NH_4ClO_4/Li_2CO_3$) | 2.0 | 2.0 |
| Reaction Time (min.) | 90 | 53 |
| Reactor Temperature (° C.) | 220–240 | 200–230 |
| Product (lbs.) | 963 | 1006 |
| $NH_3$ Recovered (lbs.) | | 132 |
| Rate of Conversion (percent/min.) | 1.00 | 1.725 |
| Product Purity (percent) | 99.7 | 99.4 |
| Yield (percent) | 96.0 | 100.0 |

Chemical analyses of the products from the above are given below:

Product, Example I:

| Compound | Wt. Percent |
|---|---|
| $LiClO_4$ | 99.68 |
| $NH_4ClO_4$ | 0.14 |
| $Li_2CO_3$ | Nil |
| Cl | 0.12 |
| | 99.94 |

Product, Example II:

| Compound | |
|---|---|
| $LiClO_4$ | 99.4 |
| $NH_4ClO_4$ | 0.42 |
| $Li_2CO_3$ | Nil |
| Cl | 0.14 |
| | 99.96 |

Although I have illustrated the process with the perchlorate, it will be obvious to those skilled in the art that ammonium nitrate can be substituted for ammonium perchlorate and the same process equipment employed. A typical example illustrating this process with the nitrate is presented below:

Example III

| | Batch |
|---|---|
| $Li_2CO_3$ (lbs.) | 536 |
| $NH_4NO_3$ (lbs.) | 1161 |
| Mol ratio ($NH_4NO_3/Li_2CO_3$) | 2.0 |
| Reaction time (min.) | 90 |
| Reactor temperature (° C.) | 237 |
| Product (lbs.) | 1000 |
| $NH_3$ recovered (lbs.) | — |
| Rate of conversion (percent/min.) | 1.0 |
| Product purity (percent) | 99.9 |
| Yield (percent) | 98.0 |

I claim:

1. A process for the preparation of lithium perchlorate comprising: heating lithium perchlorate sufficiently to render it molten; passing ammonium perchlorate and lithium carbonate into said molten lithium perchlorate and allowing said materials to react whereby to produce additional lithium perchlorate.

2. A process for the preparation of lithium perchlorate comprising: heating lithium perchlorate to a temperature of at least about 250° C. whereby to render it molten; passing ammonium perchlorate and lithium carbonate into said molten lithium perchlorate and allowing said materials to react whereby to produce additional lithium perchlorate.

3. A process for the preparation of lithium perchlorate comprising: heating lithium perchlorate to a temperature between about 250° and 275° C. whereby to render it molten; passing ammonium perchlorate and lithium carbonate into said molten lithium perchlorate; and allowing said materials to react whereby to produce additional lithium perchlorate.

4. The process of claim 3 wherein the carbon dioxide also produced is recovered and thereafter reacted with lithium hydroxide whereby to form additional lithium carbonate which in turn is recycled in said process.

5. A process for the preparation of lithium perchlorate comprising: heating lithium perchlorate to between about 250° and 275° C. whereby to render it molten; passing ammonium perchlorate and lithium carbonate into said molten lithium perchlorate; allowing said materials to react whereby to form additional lithium perchlorate; and maintaining said lithium perchlorate at an elevated temperature for a time sufficient to drive off substantially all ammonia gas, carbon dioxide and water vapor produced by said reaction.

References Cited in the file of this patent

UNITED STATES PATENTS

| | | |
|---|---|---|
| 1,276,499 | Dantsizen | Aug. 20, 1918 |
| 1,738,930 | Smith | Dec. 10, 1929 |
| 1,824,101 | Smith | Sept. 22, 1931 |
| 2,413,644 | Nicholson | Dec. 31, 1946 |
| 2,489,574 | Hampel | Nov. 12, 1949 |

OTHER REFERENCES

Ind. and Eng. Chem. (Anal. Ed.), vol. 17, No. 8, page 474 (August 1945).